US008150756B2

(12) United States Patent
Alderman et al.

(10) Patent No.: US 8,150,756 B2
(45) Date of Patent: Apr. 3, 2012

(54) SYSTEMS AND METHODS FOR OFFERING AND SERVICING HEDGE FUNDS

(75) Inventors: Robert Michael Alderman, Chester, NJ (US); Steven Neil Baumgarten, Edison, NJ (US); Paul Joseph Brennan, Plainsboro, NJ (US); Jeffrey Frazer Chandor, Oldwick, NJ (US); Winston Llewellyn Clinton, Sr., Westfield, NJ (US); Lance Daniel Larsen, Princeton, NJ (US); Stephen Michael Mulford Miller, Madison, NJ (US); Steven Bruce Olgin, West Windsor, NJ (US); Michael Louis Pungello, Princeton Junction, NJ (US); Ronald Scott Rosenberg, Basking Ridge, NJ (US); Lynda Marie Salvi-Chiara, Freehold, NJ (US); Grace Theresa Sette, Manalapan, NJ (US); Ira Paul Shapiro, Princeton, NJ (US); George Edward Skibik, Jr., Monmouth Junction, NJ (US); Paul Joseph Tartanella, Monmouth Junction, NJ (US); Kathleen Versland, Lambertville, NJ (US); Ashleigh Ryan Widger, Plainsboro, NJ (US); Courtney Lauren Hughes, Princeton, NJ (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 13/209,675

(22) Filed: Aug. 15, 2011

(65) Prior Publication Data

US 2011/0307416 A1    Dec. 15, 2011

Related U.S. Application Data

(62) Division of application No. 10/481,857, filed as application No. PCT/US2002/032005 on Oct. 3, 2002, now Pat. No. 8,024,246.

(60) Provisional application No. 60/327,378, filed on Oct. 4, 2001.

(51) Int. Cl.
*G06Q 40/00* (2012.01)
(52) U.S. Cl. ...................................... 705/36 R; 705/35
(58) Field of Classification Search .................. 705/35, 705/37
See application file for complete search history.

(56) References Cited

U.S. PATENT DOCUMENTS

| | | | | |
|---|---|---|---|---|
| 5,193,056 | A * | 3/1993 | Boes | 705/36 R |
| 6,236,972 | B1 * | 5/2001 | Shkedy | 705/26.1 |
| 6,598,028 | B1 * | 7/2003 | Sullivan et al. | 705/36 R |
| 7,020,626 | B1 * | 3/2006 | Eng et al. | 705/35 |
| 7,099,838 | B1 * | 8/2006 | Gastineau et al. | 705/35 |
| 2001/0025266 | A1 * | 9/2001 | Gastineau et al. | 705/36 |

* cited by examiner

*Primary Examiner* — Samica L Norman
(74) *Attorney, Agent, or Firm* — Michael A. Springs

(57) ABSTRACT

A family of hedge funds, serving as "feeder funds" into underlying single-manager hedge funds, formed to provide smaller investors with the ability to allocate and reallocate assets among alternative strategies, and this basic structure combining interrelated systems and methods for offering, redeeming, exchanging, valuing, reporting and servicing the same is a new approach. The system and methods described herein provide investors having less than ultra-high net worth portfolios with access to hedge funds and the potential valuable diversification to an overall portfolio, and the ability to customize their portfolio of hedge funds to their individual needs and adjust such portfolio over time as seen fit in light of changing financial needs and market conditions. This invention gives a wide range of investors access to hedge funds, creating economic value using a new source of stable investor capital for hedge fund managers, a value shared with investors through reduced costs.

62 Claims, 15 Drawing Sheets

PROGRAM FUND SUMMARY GRID
1100

| STRATEGY | ML HEDGEACCESS℠ PROGRAM FUND 1102 | | | PORTFOLIO FUND 1106 | | | |
|---|---|---|---|---|---|---|---|
| 1101 | Name 1103 | Sponsor Fees 1103 | Liquidity 1105 | Program portfolio mgt. 1107 | Minimum Direct Investment 1108 | Compound Annualized ROR (period) 1109 | Fees (per anum) 1110 | Assets Under Management (US$) (as of 6/1/02) 1111 |
| Convertible Arbitrage | A | Class 1: ___ Class 2: ___ Class 3: ___ | Quarterly | | $3,000,000 | 13.36% (1/97 to 6/02) | 1.375% Mgmt.fee; 20% Incentive fee | |
| Convertible Arbitrage | B | Class 1: ___ Class 2: ___ Class 3: ___ | Quarterly | | $5,000,000 | 18.27% (6/00 to 6/02) | 2% Mgmt.fee; 20% Incentive fee | |
| Distressed Securities | C | Class 1: ___ Class 2: ___ Class 3: ___ | Quarterly | | $5,000,000 | 8.15% (12/99 to 6/02) | 2% Mgmt.fee; 20% Incentive fee | |
| Equity Long-Short | D | Class 1: ___ Class 2: ___ Class 3: ___ | Monthly | | $5,000,000 | 17.50% (2/96 to 6/02) | 1.35% Mgmt.fee; 20% Incentive fee | |
| Equity Long-Short | E | Class 1: ___ Class 2: ___ Class 3: ___ | Monthly | | $1,000,000 | 19.76% (1/96 to 6/02) | 1% Mgmt.fee; 20% Incentive fee | |
| Event-Driven | F | Class 1: ___ Class 2: ___ Class 3: ___ | Quarterly | | $3,000,000 | 24.71% (1/96 to 6/02) | 2% Mgmt.fee; 20% Incentive fee | |
| Global Macro | G | Class 1: ___ Class 2: ___ Class 3: ___ | Monthly | | $5,000,000 | 39.31% (6/00 to 6/02) | 2% Mgmt.fee; 20% Incentive fee | |
| Merger Arbitrage | H | Class 1: ___ Class 2: ___ Class 3: ___ | Monthly | | $5,000,000 | 11.98% (5/96 TO 6/02) | 1% Mgmt.fee; 20% Incentive fee | |

FIG. 11

SYSTEMS AND METHODS FOR OFFERING AND SERVICING HEDGE FUNDS

RELATED APPLICATION

The present application is a divisional application of U.S. patent application Ser. No. 10/481,857, entitled SYSTEMS AND METHODS FOR OFFERING AND SERVICING HEDGE FUNDS, filed Oct. 3, 2002, which is a U.S. National Stage Application of International Application No. PCT/US2002/032005, entitled SYSTEMS AND METHODS FOR OFFERING AND SERVICING HEDGE FUNDS, filed Oct. 3, 2002, which claims priority to U.S. Provisional Application Ser. No. 60/327,378, filed Oct. 4, 2001.

BACKGROUND OF THE INVENTION

This invention relates to hedge funds and systems and methods for offering and servicing the same. More particularly, this invention creates a low cost method for providing access to multiple hedge funds, as well as to the ability to efficiently allocate and reallocate capital among such funds, and in each case, to do so both more frequently and in smaller minimum amounts than would be possible investing directly in these hedge funds as opposed to doing so through this invention.

Hedge funds are privately-offered, highly specialized investment vehicles, to date generally available only to very high net worth individuals and institutional investors. Because they are privately offered, hedge funds are not subject to most of the portfolio and other substantive restrictions imposed on "investment companies" and "mutual funds" (publicly-offered investment funds which must, in' the united States, be registered under the Investment Company Act of 1940). Hedge funds have the flexibility to trade a broad array of financial instruments in global markets—including taking both long and short positions as well as trading at a wide range of different leverage factors in all manner of securities, derivatives as well as other liquid and illiquid assets.

Hedge funds implement numerous different investment strategies. Among the most common of these strategies are: convertible arbitrage, distressed securities, equity arbitrage, directional equity (long/short), event driven, fixed income arbitrage, global macro and market neutral. There is no material limitation on the strategies which hedge funds may implement.

Because the "skill-based" strategies which hedge funds implement often have as much profit potential in declining as in rising markets, hedge funds are generally perceived to offer a potentially valuable element of diversification for a traditional portfolio of "long-only" stock and bond holdings (often concentrated in a single country's economy, whereas hedge funds are able to access global markets). Modern portfolio theory has established the long-term benefits of including "non-correlated asset classes"—as hedge funds are generally classified—in an overall portfolio. However, broadly diversified, individually tailored multi-hedge fund portfolios have to date been inaccessible to all but the extraordinarily wealthy because of the high minimum investment required, the difficulty of obtaining access to many of the most successful funds and the inability to exchange among unaffiliated funds.

Not only are hedge funds' minimum investments typically very large, but also such investments are typically illiquid. Hedge funds impose severe limitations on investors' ability to make as well as redeem investments (redemptions often being the only meaningful source of hedge fund investor liquidity as there is no market for many hedge fund interests). Redemptions generally are permitted as infrequently as quarterly, semi-annually or even only annually. Numerous funds impose even more restrictive redemption terms (e.g., a 2 to 3 year required commitment). Moreover, in order to redeem, advance notification, generally ranging from 30 to 90 days, is commonly required. Once a redemption has been permitted, many hedge funds do not pay the first installment of redemption proceeds until 45-60 days after the effective date of redemption, and in the case of a complete redemption by an investor it is not uncommon for a hedge fund to withhold up to 10% of the estimated value of the redemption proceeds until completion of the fund's annual audit (which may be more than a year after the redemption date). The illiquidity of hedge fund investments serves-as a material entry barrier to smaller investors as, due to such illiquidity, they must have no need, contingent or otherwise, for the substantial amounts which they must invest in a hedge fund. Such illiquidity also increases the difficulty of participating in individual tailored, diversified portfolios of hedge funds.

Not only has the large minimum investment size and illiquidity of hedge funds made it difficult for most investors to participate in diversified portfolios of hedge funds selected individually by such investors, but also the material differences between hedge funds in features unrelated to the strategy implemented (e.g., redemption provisions, minimum subscriptions, tax reporting, etc.) have made allocating and reallocating among different funds the province only of specialized "funds of funds" managers capable of evaluating these differences and developing combination portfolios with overall structural attributes consistent with their portfolio objectives. These managers add significantly to the overall economic costs to investors as well as restricting or eliminating "investment transparency" as disclosure of the hedge funds included in the portfolios which they develop to investors would compromise the confidentiality of the managers, asset allocation strategies.

A more fundamental disadvantage of "funds of funds" managers is that "funds of funds." managers cannot select hedge fund portfolios with any single investor in mind, as opposed to the generalized portfolio objectives of the aggregate group of investors in their "funds of funds." However, different investors have very different particular objectives and risk tolerance levels as well as different core portfolios which they are seeking to diversify.

Another impediment to individually tailored multi-hedge fund portfolios has been that acceptance into a hedge fund into which an investor wished to reallocate capital has heretofore by no means been assured. The delays in obtaining such acceptance (and, in certain cases, the inability to do so) are disruptive of an asset allocation strategy.

The administrative entry barriers to smaller investors participating in diversified hedge fund portfolios have also been high. Private placements in general usually have complicated and burdensome subscription documents which must be signed by all investors. Privately-placed hedge funds have particularly complicated and burdensome subscription documents because investors must, for regulatory purposes, provide the sponsor with a number of representations and warranties peculiar to private investment funds in order to verify the subscriber's eligibility and allow them to subscribe. Completing and processing the necessary subscription documentation makes hedge fund investing procedurally difficult typically the province of institutions and wealthy family offices with the resources to employ staff to perform this function.

SUMMARY OF THE INVENTION

It is an object of this invention to provide a family of funds fungible in structure but accessing underlying hedge funds with diverse strategy types. These funds have enhanced investor liquidity, transparency as to the identity of the underlying portfolio managers, flexible exchange rights, as well as simplified documentation and accounting, valuation and reporting systems conducive to allowing smaller investors to act as their own asset allocators. Additionally, it is an object of this invention to provide eligible clients access to a program of funds with minimum investments substantially below what would be required for a direct investment into a single underlying hedge fund. This invention substantially eliminates the possibility of delays in obtaining acceptance into a hedge fund by providing that acceptance into the program of this invention constitutes acceptance into each of the feeder funds included in the program, provided capacity is available.

It should be noted that in this description and in the claims which follow, if a fund within the program of the invention is described as having a particular characteristic that is greater or less than a comparable characteristic of a fund outside the program (e.g., a shorter redemption delay or a lower minimum investment), it is intended that the comparison be made between funds that are as substantially alike as possible. Thus, the second fund, to which a comparison is being made with regard to one characteristic of a first fund within the program of the invention, should be considered to be a fund whose characteristics, other than the characteristic being compared, are substantially identical to those same characteristics of the first fund, bearing in mind that by "substantially identical" is meant that a very small number of those characteristics (e.g., at most one or two characteristics), in addition to the characteristic being compared, may differ as between the first and second funds without rendering the first and second funds incomparable. Similarly, even though the second fund may be available both within the program of the invention and outside the program of the invention (and may even be the same as the first fund except for being outside the program), when a comparison is made the comparison is to the second fund only as it exists outside the program.

This invention provides the typical investor with the opportunity to diversify his or her portfolio into the hedge fund sector while individually selecting managers and strategies (with the aid of expert advice from the financial advisors associated with the program if desired) and customizing his or her investment to specific portfolio needs and objectives rather than investing in a multi-manager fund in which the investors relinquish all control over—or even knowledge of—the managers included in the portfolio as well as any ability to customize the portfolio to their individual needs. Because this invention makes available a program of single-manager hedge funds in accessible investment amounts, participants for the first time are able personally to customize and dynamically manage a portfolio of hedge funds representing an investment of a size feasibly and prudently includable in the overall portfolios of investors other than the ultra-wealthy. Through the frequent 'subscription and redemption opportunities made available through the invention, the fungibility of the program funds, the acceptance, provided capacity exists, of all program participants into each of the feeder funds into which they may wish to exchange and the development of accounting, valuation, reporting and documentation systems designed to facilitate exchanges among and redemptions from the feeder funds included in the program, the invention permits a vastly expanded investor base to have access to diversified alternative investment strategies.

In addition to permitting investors themselves to customize their portfolios, the invention gives added flexibility to professional "fund of funds" managers in operating their products by permitting redemptions and exchanges among hedge funds in much smaller denominations than would otherwise be possible. This facilitates the use of the program in a variety of hybrid investment products—for example, variable annuities—in which tax or other regulations restrict the ability of investors themselves to control the selection of the underlying funds.

In some embodiments, this invention creates a low cost method for providing access to multiple hedge funds, as well as to the ability to allocate and reallocate capital among such funds, to an extended client base not to date able to meet the minimum investment requirements for most individual hedge funds. In addition, some embodiments of this invention permit these small minimum investments, allocations and reallocations to be redeemed and exchanged with significantly more liquidity than is possible in most hedge fund structures. The combination of smaller minimums and enhanced liquidity provides a qualitatively more flexible platform through which a widely expanded group of investors can access alternative investment strategies. The enhanced liquidity, in accordance with some embodiments of this invention, is provided by efficiently allocating and reallocating assets among different hedge funds for cash flow management purposes (otherwise the reallocation of capital to a new hedge fund strategy would be delayed pending receipt of the related redemption proceeds, although the participation of such capital in the performance of the hedge fund from which the redemption is made ceases as of the effective date of redemption, generally 45-60 days before the first redemption proceeds are received).

The present invention facilitates admitting retail investors into the hedge fund field. Not only is this a source of new capital for hedge fund sponsors, but also a source of more stable capital to such sponsors, as the retail investor pool, which includes multiple individual decision-makers, can be expected in the aggregate to turn over much more slowly than capital invested by the limited number of large institutional investors. The latter will typically redeem their entire investment of many millions of dollars as a single investment decision. This exposes the hedge fund sponsor to the risk of having to make material portfolio adjustments as a result of decisions reached by a single or limited number of decision-makers (and perhaps due to factors entirely unrelated to the hedge fund itself). Not only does the invention's overall investment in any given hedge fund provide the stability created by diversifying investment decisions across numerous small investors, but also the invention permits the netting of redemptions and subscriptions, further increasing capital stability. Stable capital not only reduces the risk of forced hedge fund liquidations at disadvantageous prices in order to meet large redemptions, but also has economic value to the hedge fund sponsors, providing a stable base on which percentage-of-assets fees are calculated as well as an assured time period over which capital is available to generate profits and performance-based compensation. This value, in turn, is shared by the hedge fund sponsors in a variety of ways—fee rebates, improved redemption terms, accelerated reporting, etc.), making the program both more efficient and more accessible to investors.

In accordance with some embodiments of this invention, eligible clients are provided access to a program of multiple hedge funds with a minimum investment into the overall program (providing exposure to a number of different hedge funds) substantially less than that typically required to invest in a single hedge fund. In accordance with this invention, investors are provided with the capability to individually customize their hedge fund portfolios and are provided with enhanced investor liquidity and the flexibility to exchange among funds without need of obtaining hedge fund approval for each individual exchange. In some embodiments, such flexibility is enhanced by facilitating redemption and subscription cash flows as well as by maintaining uniformity in the structure and business terms (i.e., fungibility other than in respect of strategies employed) of the various Feeder Funds included in the program. Participation in the program is facilitated by reducing subscription documentation as well as simplifying the accounting and customer securities statement reporting while providing investors with a reporting package well-adapted to frequent exchanges among the feeder funds included in the program. This reporting feature is particularly important to U.S. taxable investors who must consolidate the tax information received from each of the feeder funds in which they participate during a fiscal year.

Combining low minimum investments, structural fungibility among the program's feeder funds, transparency of each feeder fund in such a portfolio contrasted with either no or limited transparency in a fund of fund structure, an efficient exchange and redemption process and user-friendly reporting—and all at a reasonable cost made possible by the economic value created by this invention for the hedge fund sponsors, of which they rebate a portion to the program—makes it possible for smaller investors to be able to customize their own multi-manager portfolios in the alternative investment strategy field.

A fundamental mechanism of the invention is the use of feeder funds to aggregate individual investments so that the underlying hedge funds in dealing with each feeder fund as a single investor effectively give greater investment flexibility to the investors in the feeder fund (e.g., the feeder funds can permit small minimum investments because through aggregating such investments the feeder funds can meet the underlying hedge funds' minimums, and the feeder funds can permit more frequent redemptions and exchanges than the underlying hedge funds because redemptions or exchanges from the feeder funds may be offset by subscriptions so that such redemptions do not result in corresponding redemptions from the underlying hedge funds). The invention has materially enhanced the flexibility of the feeder fund structure by creating structural fungibility, administrative efficiency (e.g., reduced administrative barriers) and enhanced liquidity for investors participating not in a single feeder fund but in a family of feeder funds. Creating and enhancing the potential advantages made possible by a family of feeder funds is a basic embodiment of the invention.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 11 is a tabular compilation illustrating a preferred embodiment of the method according to this invention;

DETAILED DESCRIPTION OF THE INVENTION

Figure 1:
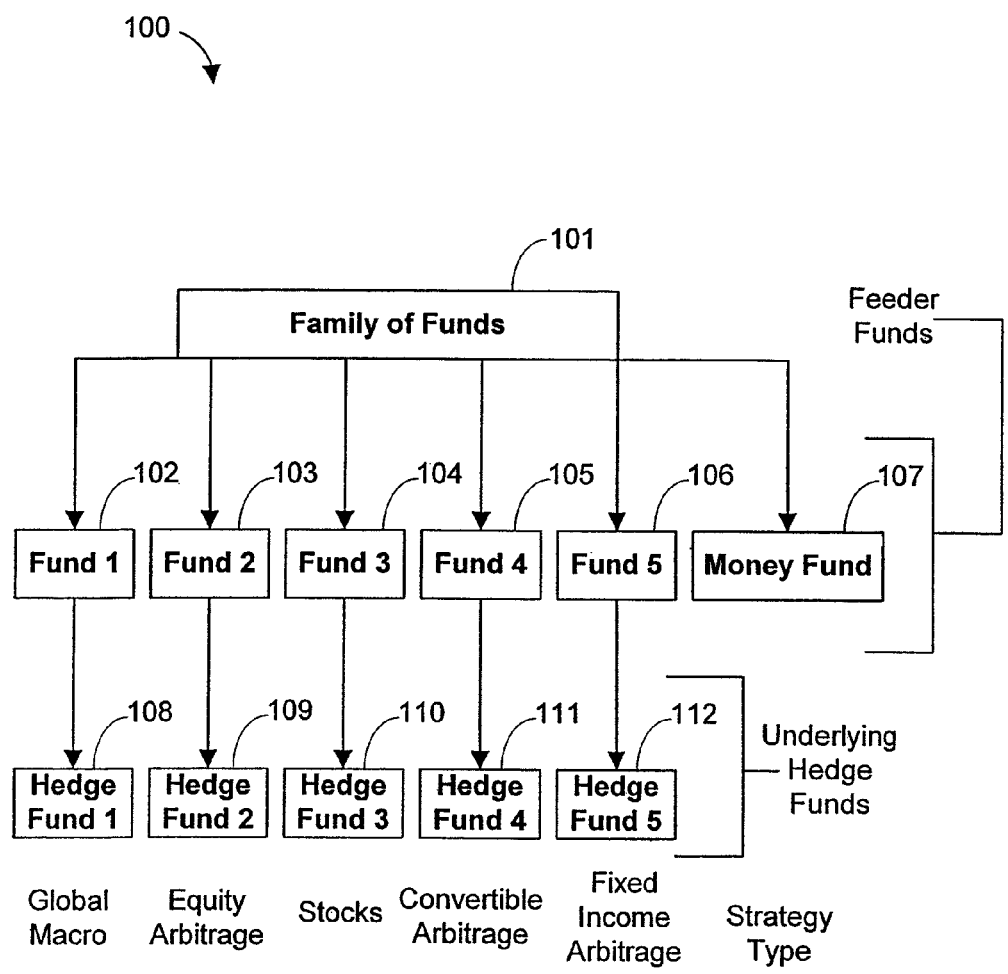
FIG. 1 is a flow chart illustrating a preferred embodiment of the method according to this invention.

This invention provides a way for investors to access hedge funds combining a number of features not previously combined into any "family of hedge funds" programs, such as: (1) dramatically reduced minimum investments; (2) more frequently available purchases and redemptions; (3) greater liquidity in receiving redemption and exchange proceeds; (4) exchangeability among the various hedge funds included in the program; (5) a money-market feeder fund option; (6) streamlined investment, exchange and redemption documentation; (7) an on-line web-based system for qualifying and registering eligible clients; (8) consolidated financial valuation and tax reporting; (9) consistent fees and fungible business terms within a competitive range; (10) account statement treatment comparable to that applicable to any exchange-traded stock; (11) aggregation of related taxable and tax exempt accounts for treatment as a consolidated investor; and (12) different share classes which may be at the choice of some categories of investors with different pricing structures. Each of these individual features has been available in other feeder fund programs, but never previously have all been combined in a single program. The effect of such combination is to provide a qualitatively new means of accessing alternative investment strategies.

The substantially increased client base and statistically more stable capital which the program provides creates material economic value for the hedge fund sponsor value which can, in turn, be shared with investors, increasing the benefits as well as the attractiveness of the program (further increasing the economic value of the program to the hedge fund sponsor).

In some embodiments, the financial management company sponsoring a program may negotiate with each hedge fund in a programs family of funds to receive a portion of their management and incentive fees. Such arrangements may allow such management company to raise capital while reducing marketing expenses and other fees that are normally passed through to investors.

In some embodiments, investors may exchange their investment in one hedge fund in the family of funds for an investment in one or more other hedge funds within the family. In accordance with some embodiments of this invention, hedge funds in the family of funds may agree to provide the redemption proceeds to the financial management firm within a predetermined period materially shorter than would otherwise be the case and established expressly so as to facilitate exchanges among program funds (importantly, one month or less, as hedge funds typically permit subscriptions once a month).

In some embodiments, the incremental economic value generated by the program makes it possible to eliminate any up-front selling commission charges otherwise associated with exchanging into a new feeder fund (otherwise indistinguishable from a new investment on which a selling commission is due).

An investor who chooses to exchange out of a feeder fund in accordance with this invention preferably will not pay redemption or exchange charges other than those imposed by the underlying fund in which the program feeder funds invest. Interests acquired in an exchange preferably will be treated as if they have been outstanding since the date of their initial issuance for purposes of determining ongoing compensation due to the selling agent. This facilitates exchanges by avoiding any resulting penalty to the selling agents, financial advisors. Otherwise, exchanging an interest preferably will be made on the same terms as making a new subscription for such interest.

The use of the feeder fund structure for the program of funds makes it possible to provide a number of benefits not available in the case of direct investments in the underlying hedge funds, including, without limitation, smaller minimum investment size, netting of redemptions and subscriptions, exchange privileges and consolidated reporting for an overall portfolio of program feeder fund investments.

In some embodiments, exchanges preferably will be made between interests of the same class and series in the various funds in the family of feeder funds. In some embodiments, exchanges preferably will be made without distinction among different classes and series of investment interests. In accordance with some embodiments of this invention, exchanges may be limited by a predetermined minimum amount (e.g., $100,000) and may be limited by predetermined increments (e.g., $1,000).

When an investor exchanges between feeder funds, the exchange preferably will be facilitated (without the need to obtain credit facilities) by reducing the time required to receive and reinvest the proceeds of the hedge fund from which an exchange is being made in the hedge fund into which the exchange is being made. Preferably this reduction will permit the exchange proceeds to be reinvested no later than the beginning of the month following the exchange. For example, if an investor exchanges from Feeder Fund A to Feeder Fund B as of March 31, such investor would cease to participate in Feeder Fund A as of March 31, and would begin to participate in Feeder Fund B as of May 1. In addition, the ability of the feeder funds to net subscriptions and redemptions can provide enhanced liquidity, as it may not be necessary to obtain redemption proceeds (or even redeem feeder fund investments in order to accommodate an exchange) as opposed to redirecting new feeder fund subscriptions to the payment of redemptions or exchanges.

In some embodiments, investors may exchange from other program feeder funds into a money-market fund. A money-market feeder fund may give investors in the program the option of allocating all or part of their program investment to "riskless" highly liquid investments during periods when they wish to reduce their hedge fund exposure on an interim basis, enhance their liquidity and/or meet program minimums in whole or in part with a lower risk investment. Exchanges out of the money-market feeder fund preferably will be permitted on shorter notice than from the feeder funds included in the program. For example, investors may be required to provide only 15 days' notice in order to exchange out of the money-market feeder fund as of any calendar month-end. Exchanges out of the money-market feeder fund into other program feeder fund(s) will preferably be effective promptly—preferably as of the beginning of the immediately following month.

In accordance with some embodiments of the present invention, the sponsor of the family of funds preferably will introduce additional hedge funds in the program on an ongoing basis, expanding the range of generally fungible hedge funds available to program participants.

In accordance with some embodiments of this invention, "fund of funds" managers will make use of the program's flexibility to "fine tune" their multi-manager portfolio allocations as well as to differentially adjust such allocations to meet different investors' specific portfolio needs and objectives. In accordance with some embodiments of this invention, the program sponsor may offer investors the option of individually customizing their portfolios or having the sponsor or some third party provide asset allocation services, allocating and reallocating investor capital among the program funds on a discretionary basis. This latter embodiment of the invention permits the invention to be used as a component of various financial products—such as variable annuities—in which investors are prohibited from determining the selection of the underlying hedge funds (due to tax, regulatory or other reasons). In addition, this latter embodiment could be used as a means of smaller investors obtaining customized asset allocation services from a "fund of funds" manager which maintains investment transparency and uses the economic value created by the program for hedge fund sponsors to defray the cost of such asset allocation services.

In accordance with some embodiments of this invention, the subscription documentation process is simplified.

In some embodiments, the initial program subscription agreements may be completed on-line (e.g., intranet, Internet, dumb terminal, etc.) and may be processed with an electronic signature.

Program documents, whether electronic or not, preferably need to be completed by a subscriber only once at the time of the initial investment in the program. Once a subscriber completes a program subscription document, the subscriber preferably will complete a more abbreviated form (e.g., a purchase form, an exchange form, a purchase/exchange form, etc.) each time he or she subscribes to or exchanges into one of the funds in the family of feeder funds. (Preferably, an investor making a subsequent investment into a fund in which he or she is currently an investor need not submit any additional form.) With this expedited subscription documentation process, investors preferably will avoid completion of a much longer, complicated subscription agreement for each fund in which they invest, a procedural burden which could have a material "chilling effect" upon otherwise attempting to allocate and reallocate assets among different funds. In addition, the program documents would assure acceptance of exchanges (provided the fund receiving the exchange was open for investment). There would be no uncertainty, as there would be in the case of direct investments in the underlying hedge funds, as to whether a hedge fund would accept an exchange (the uncertainty as to whether a proposed exchange would be accepted being fundamentally disruptive of any asset allocation strategy).

The program minimum, in accordance with some embodiments of this invention, may, be set at a reduced predetermined amount (generally significantly lower than the minimum of most individual hedge funds), and a further reduced predetermined minimum amount may apply for investment in any one program fund. The reduced minimums allow a client who wants access to hedge funds and the ability to take an active role in his or her portfolio management to customize such portfolio by investing among a variety of hedge funds in smaller minimums. In addition, a number of related clients (e.g., sufficiently closely related members of a family), may be able to aggregate their accounts, so that even if no one account reaches the program minimum, they may still participate in the program if the aggregate amount in the related accounts meets the program minimum. The same type of aggregation may apply for a single client with more than one account. Both taxable and tax-exempt accounts may be aggregated for these purposes.

In some embodiments, investors may be able to have ongoing information concerning all available funds in the family of feeder funds through consolidated reporting. Investors preferably will receive a monthly statement including the performance of each of these funds on a periodic basis (e.g., yearly, quarterly, monthly, etc.), the report preferably will contain commentary from the managers of each of the underlying hedge funds. This information will provide investors with information on the basis of which to make informed investment decisions about allocations and reallocations of their investments among different hedge funds included in the program.

A method and system for offering and servicing hedge funds in accordance with the present invention may be described in conjunction with FIGS. 1-13. This method and system for offering and servicing hedge funds preferably may be used for offering and servicing other privately offered alternative investment products.

FIG. 1 shows the flow of information in a method 100 for offering and servicing hedge funds. A family of funds 101 provides various feeder funds 102-106. The feeder funds preferably also include a money-market fund 107. The feeder funds 102-106 provide investors access to underlying hedge funds 108-112, and allow investors to invest in numerous strategies (e.g., convertible arbitrage, distressed securities, directional equity (long/short), event driven, fixed income arbitrage, market neutral, global macro, equity arbitrage, stocks, etc.) as a result of the various strategies used by those hedge funds 108-112.

Figure 2:
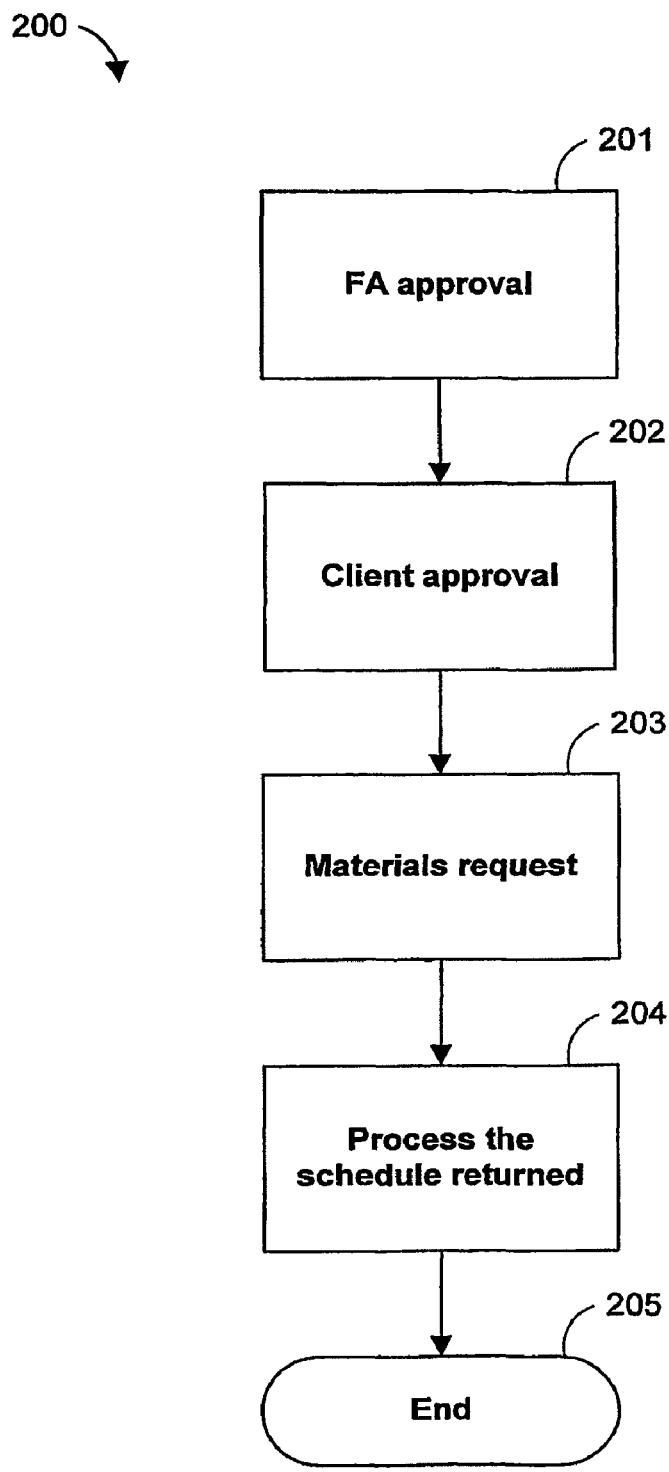
FIG. 2 is a flow chart illustrating a preferred embodiment of the method according to this invention.

FIG. 2 shows an overview of the flow of information in a preferred embodiment of a method 200 according to this invention for offering and servicing hedge funds. At step 201, a financial advisor is approved based on pre-determined criteria used to establish whether the financial advisor is qualified to sell. At step 202, the client is approved based on criteria including minimum net worth, minimum investable net worth and income, minimum investable assets, whether the investor meets the criteria for being a sophisticated investor, whether there is a pre-existing relationship for the investor, and the "period of time of the pre-existing relationship. The subscription materials are requested at step 203 (via any appropriate method—e.g., intranet, Internet, dumb terminal, phone response system, etc.). The request for materials is processed and a schedule outlining the request is sent to a fulfillment center at step 204. The method ends at step 205.

Figure 3:
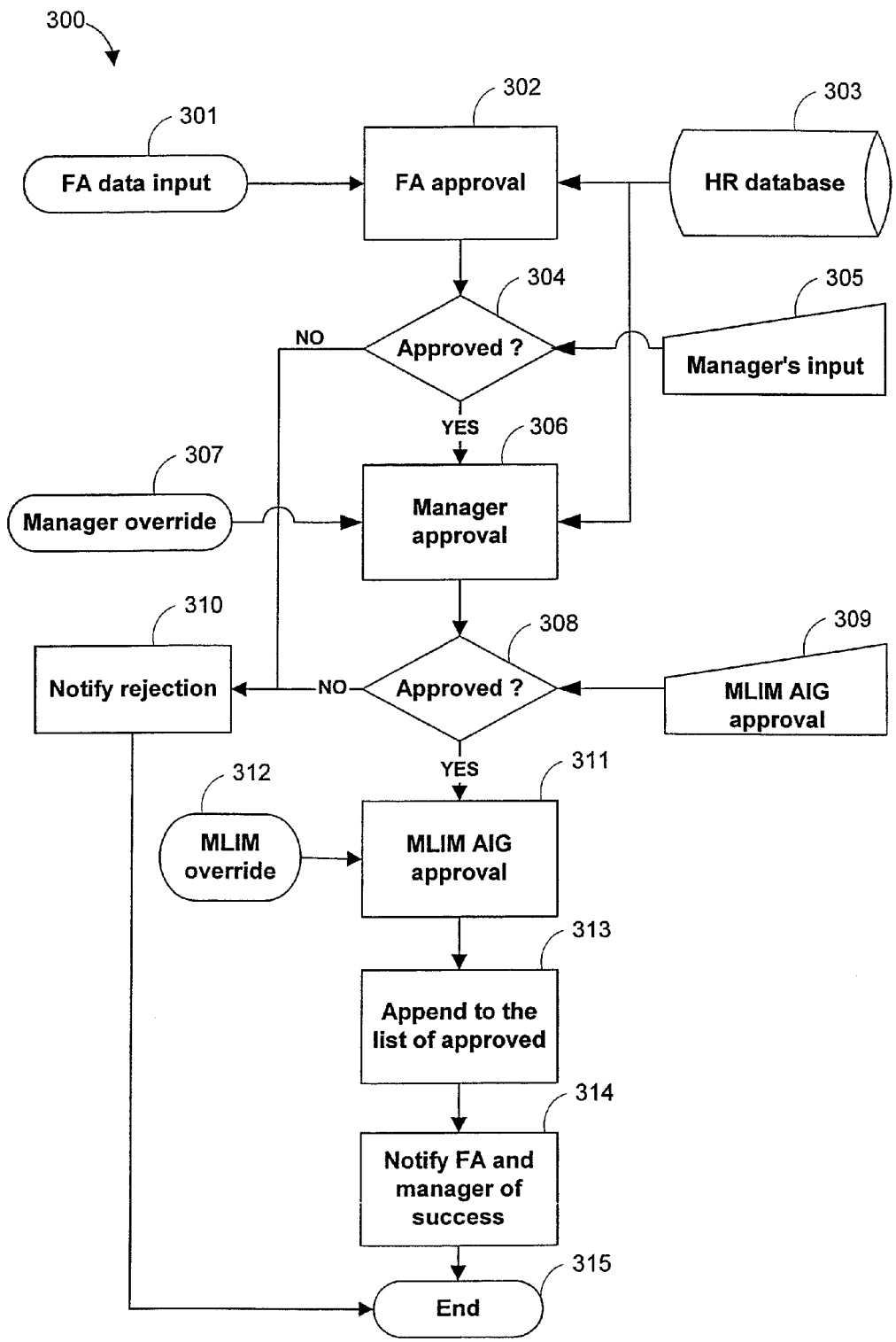
FIG. 3 is a flow chart illustrating a preferred embodiment of the financial advisor approval step 201 of the method illustrated in FIG. 2.

FIG. 3 is a flow chart illustrating a preferred embodiment of the financial advisor approval step 201 of the method illustrated in FIG. 2. At step 301, the financial advisor inputs a request for approval to sell hedge funds in accordance with this invention. At step 302, the request for approval and data from the human resource database 303 are prepared for review. Based on a manager's input 305 and preferably completion of online training, it is determined, at step 304, whether the financial advisor is approved. If not approved, the method proceeds to step 310 and notifies the financial advisor of the rejection and the method ends at step 315. However, a manager's override 307 can divert a rejection from proceeding to 310 and at 306 the rejection may be changed to an approval. At step 308, the approval status is reviewed to determine whether a manager's override 307 was exercised. Additionally, at step 308, the sponsor's approval 309 is sought. If a rejection is noted at step 308, the method proceeds to 310 and notifies the financial advisor of the rejection, and ends at 315. If, however, approval is noted at step 308, the method once again seeks sponsor approval and allows a sponsor's override 312 of the approval. Based on the sponsor's acceptance or rejection of such approval, the list of approved financial advisors is appended at step 313, and the financial advisor and manager are notified of the approval at 314. The method ends at step 315.

Figure 4:
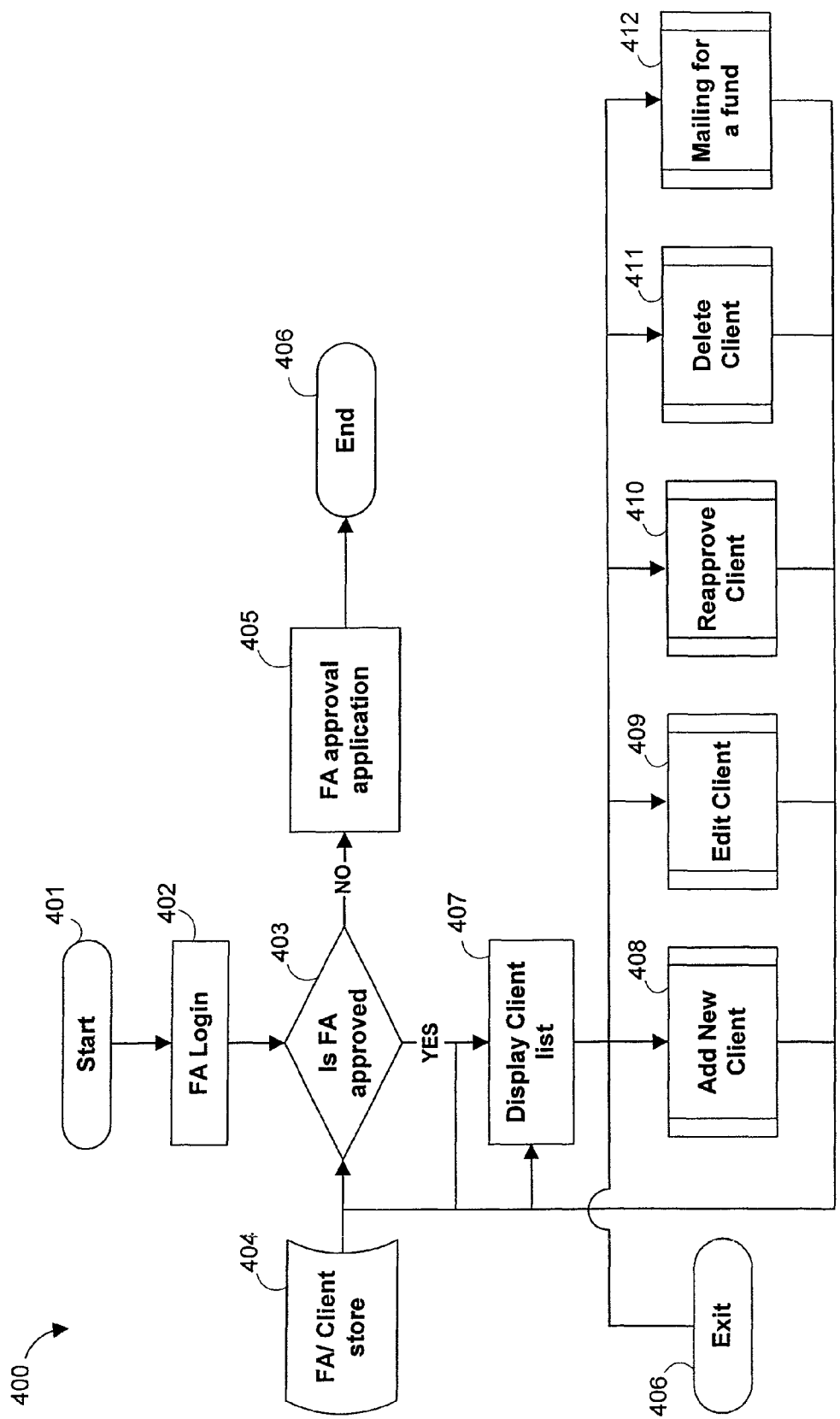
FIG. 4 is a flow chart illustrating a preferred embodiment of the client approval step 202 of the method illustrated in FIG. 2.

FIG. 4 is a flow chart illustrating a preferred embodiment of the client approval step 202 of the method illustrated in FIG. 2. Specifically, FIG. 4 shows the flow of information once a financial advisor is approved as a advisor qualified to sell funds in accordance with this invention (as shown in FIGS. 2 and 3). The flow of information in method 400 shows a process for the financial advisor to interact with client information. The method begins at step 401. At step 402, the financial advisor logs into the system with the appropriate user identification and password or other secure access device. At step 403, the system determines whether the financial advisor is approved. Data from the financial advisor/client store 404 is used to make this determination. If not, the method proceeds to step 405, and allows the financial advisor to apply for approval and ends at step 406. If yes, the client list is displayed at step 407 (using data from the financial advisor/client store). The financial advisor also has the ability to add a new client 408, edit a client 409, re-approve a client 410, delete a client 411 or access mailing for a fund 412. The method ends at step 413.

Figure 5:
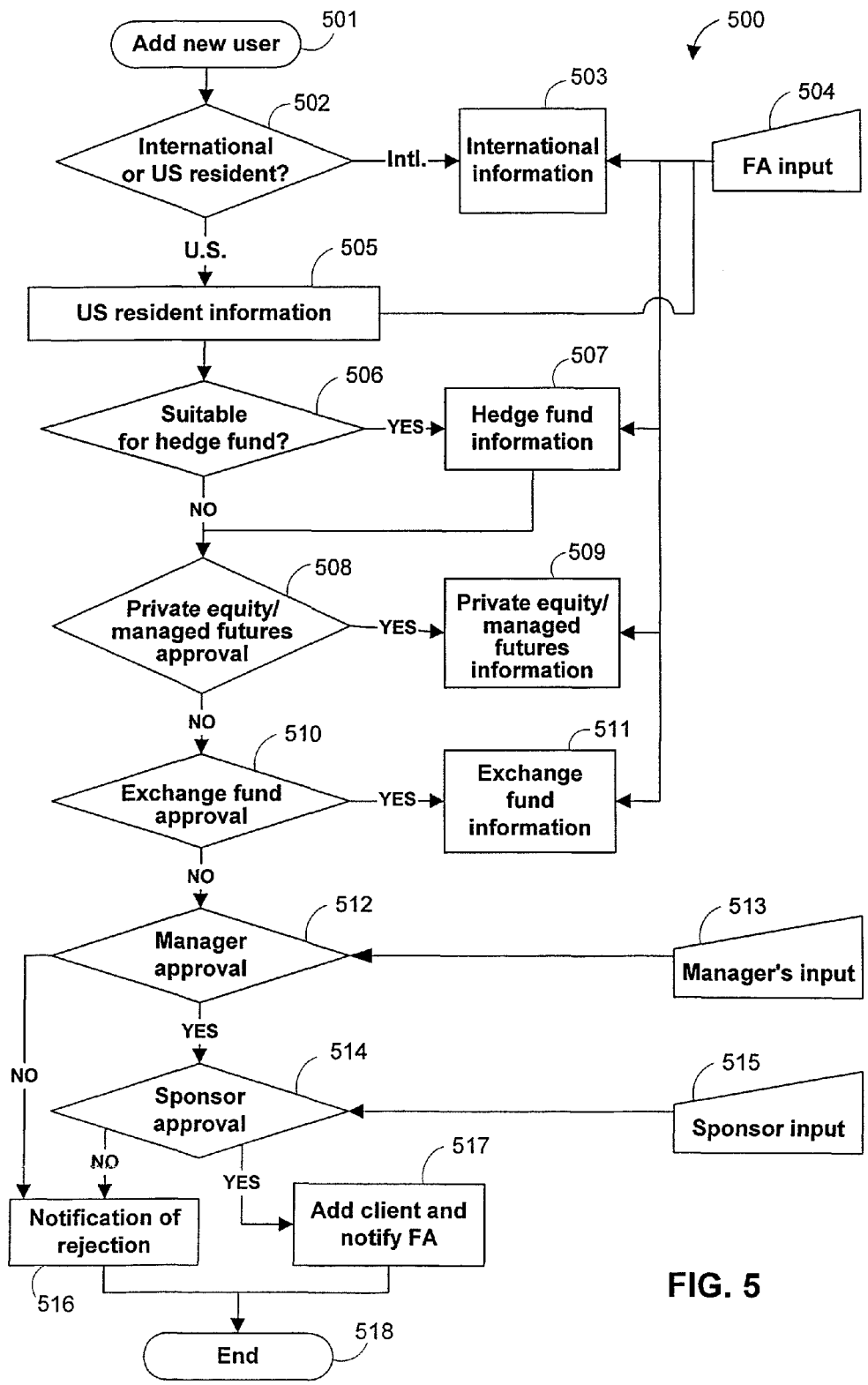
FIG. 5 is a flow chart illustrating another preferred embodiment of the client approval step 202 of the method illustrated in FIG. 2.

FIG. 5 is a flow chart illustrating another preferred embodiment of the client approval step 202 of the method illustrated in FIG. 2. Specifically, FIG. 5 shows the flow of information in a method 500 for adding a new client. At step 501, the financial advisor chooses to add a new investor. At step 502, it is determined whether the investor is an international investor or U.S. investor. If the investor is an international investor, international information is provided at step 503 including input from the financial advisor 504; however, if at step 502 it is determined that the investor is a U.S. resident, the method 30 proceeds to step 505 where information for U.S. investors is provided with additional input from the financial advisor 504. The system via steps 506, 508, 510, and 512, and with input from 504 and 513, determines suitability for particular products based on eligibility of the client. At step 506, it is determined whether the investor is suitable for a particular investment. If not, the method proceeds to step 508. Otherwise, hedge fund information is provided at step 507 with input from the financial advisor 504. At step 508, it is determined whether the investor has private equity/managed futures approval. If not, the method proceeds to step 510. Otherwise, private equity/managed futures information is provided at step 509 with input from the financial advisor 504. At step 510, it is determined whether the investor has approval of the exchange fund. If not, the method proceeds to step 512. Otherwise, exchange fund information is provided at step 511 with input from the financial advisor 504. At step 512, a manager's input 513 is sought to override a calculation at steps 505-510 of unsuitability for particular hedge funds, based on eligibility for the various alternative products. If the manager disapproves, the method proceeds to issue notification of rejection 516. If the manager approves, the method proceeds to 514 to seek approval of the sponsor with input from the sponsor 515. If approval is not granted, the method proceeds to step 516 and notifies the investor of rejection. If approval is granted, the method proceeds to step 517 at which time the client is added and the financial advisor is notified. The method ends at step 518.

Figure 6:
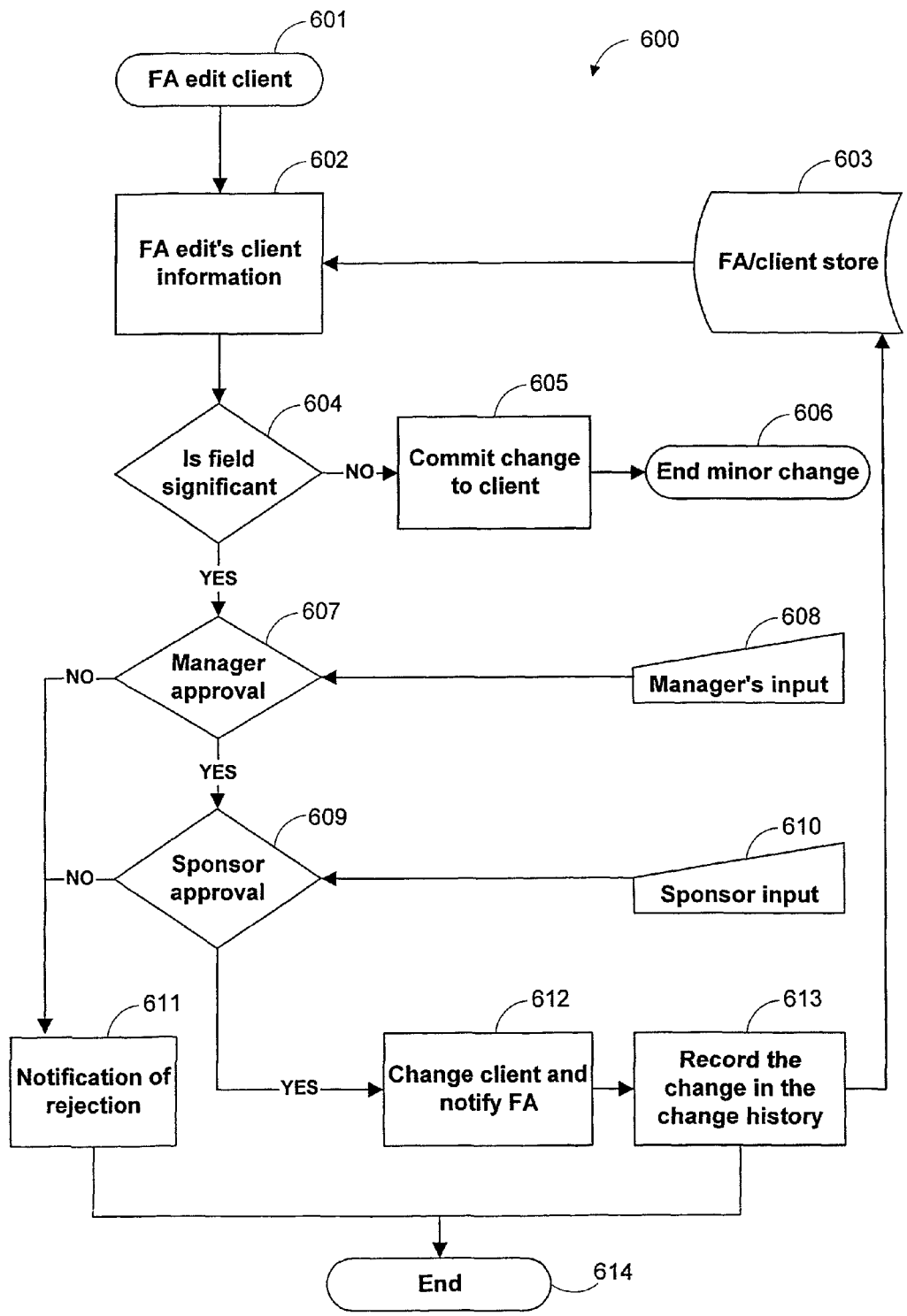
FIG. 6 is a flow chart illustrating a preferred embodiment of the method according to this invention.

FIG. 6 is a flow chart illustrating the flow of information in a preferred embodiment of a method 600 for editing client information. At step 601, the financial advisor chooses to edit a client's profile. At step 602, the financial advisor edits the client information using the data from the FC/client store database 603. At step 604, the system determines whether the edited field is significant. If the edited field is not significant, the change is committed to the client and the method ends at step 606. If, at step 604, it is determined that the field is significant, manager approval 607 is sought at step 607 and input is received from the manager 608. If approved by the manager, at step 609, sponsor approval is sought and sponsor input 610 is received. If either the manager at step 607 or sponsor at step 609 rejects the edit, the financial advisor is notified at step 611 and the method ends at step 614. If the sponsor approves the edit, the client data is changed and the financial advisor is notified at step 612. Additionally, at step 613, the change is recorded in the change history database and the method ends at step 614.

Figure 7:
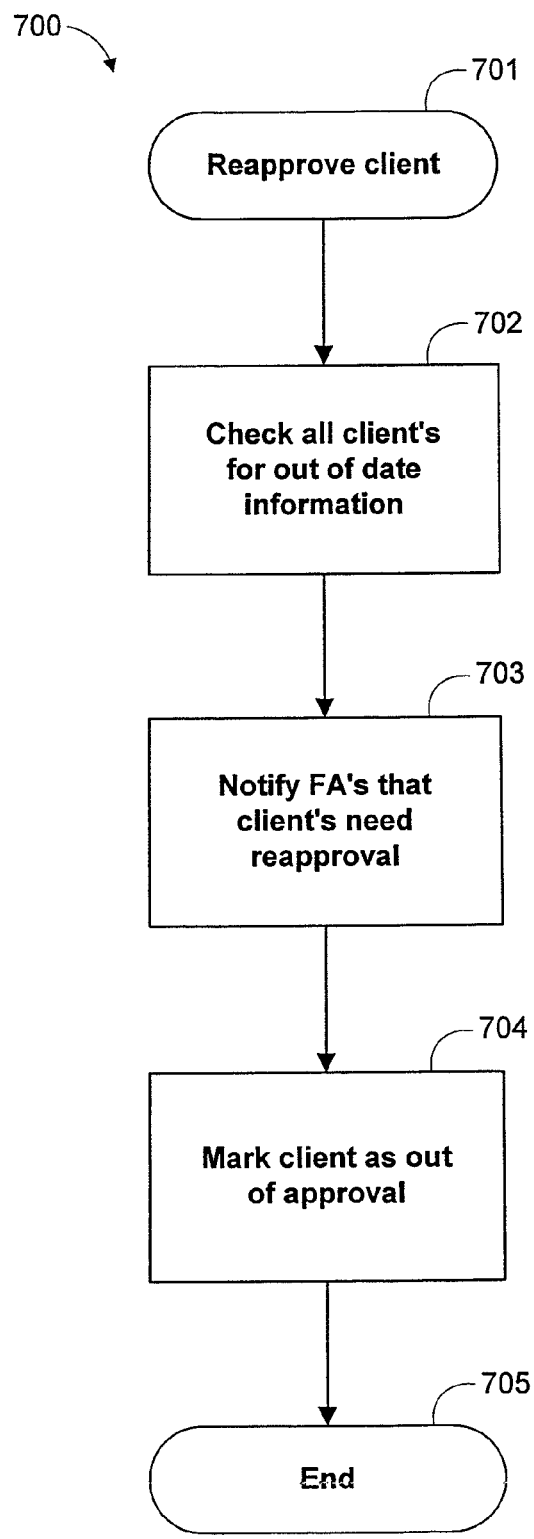
FIG. 7 is a flow chart illustrating another preferred embodiment of the client approval step 202 of the method illustrated in FIG. 2.

FIG. 7 is a flow chart illustrating another preferred embodiment of the client approval step 202 of the method illustrated in FIG. 2. Specifically, FIG. 7 illustrates the flow of data during a periodic check to determine which clients may need re-approval. At step 701, the method is initiated. At step 702, the system checks all client information and determines which client files maintain out-of-date information. At step 703, the financial advisors representing clients with out of date information are notified of the need for re-approval. At step 704, the client files are marked as out of approval. The method ends at step 705.

Figure 8:
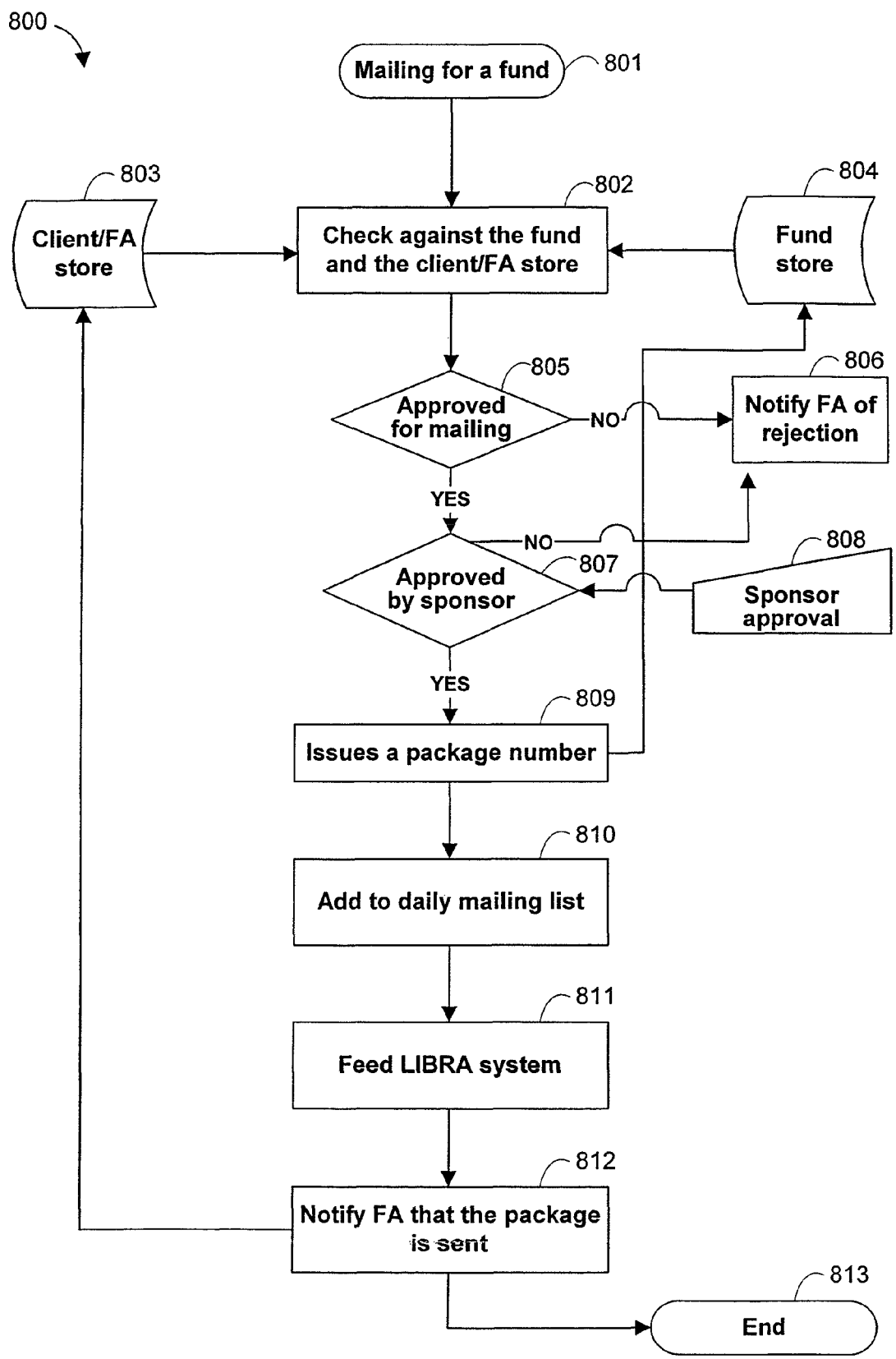
FIG. 8 is a flow chart illustrating a preferred embodiment of the materials request step 203 of the method illustrated in FIG. 2.

FIG. 8 is a flow chart illustrating a preferred embodiment of the materials request step 203 of the method illustrated in FIG. 2. Specifically, FIG. 8 show the flow of the method of preparing mailings to investors. At step 801, a mailing is prepared. At 802, the system compares the fund data 804 with client and financial advisor information 803 to determine which financial advisors and clients are approved for mailing. At 805, the system determines whether financial advisors are approved for the mailing. If not, the system proceeds to step 806 and notifies the financial advisor of the rejection. If approved, the system proceeds to step 807 and determines whether the sponsor 808 has approved the mailing. If the sponsor has not approved the mailing, the system proceeds to step 806 and notifies the financial advisor of the rejection. Otherwise, a package number is issued at step 809. At step 810, the financial advisor and/or client is added to the mailing list for that day. At step 811, automatically feeds a fulfillment system that distributes documents to customers. At step 812, the financial advisor is notified that the package is sent and the method ends at step 813.

Figure 9:
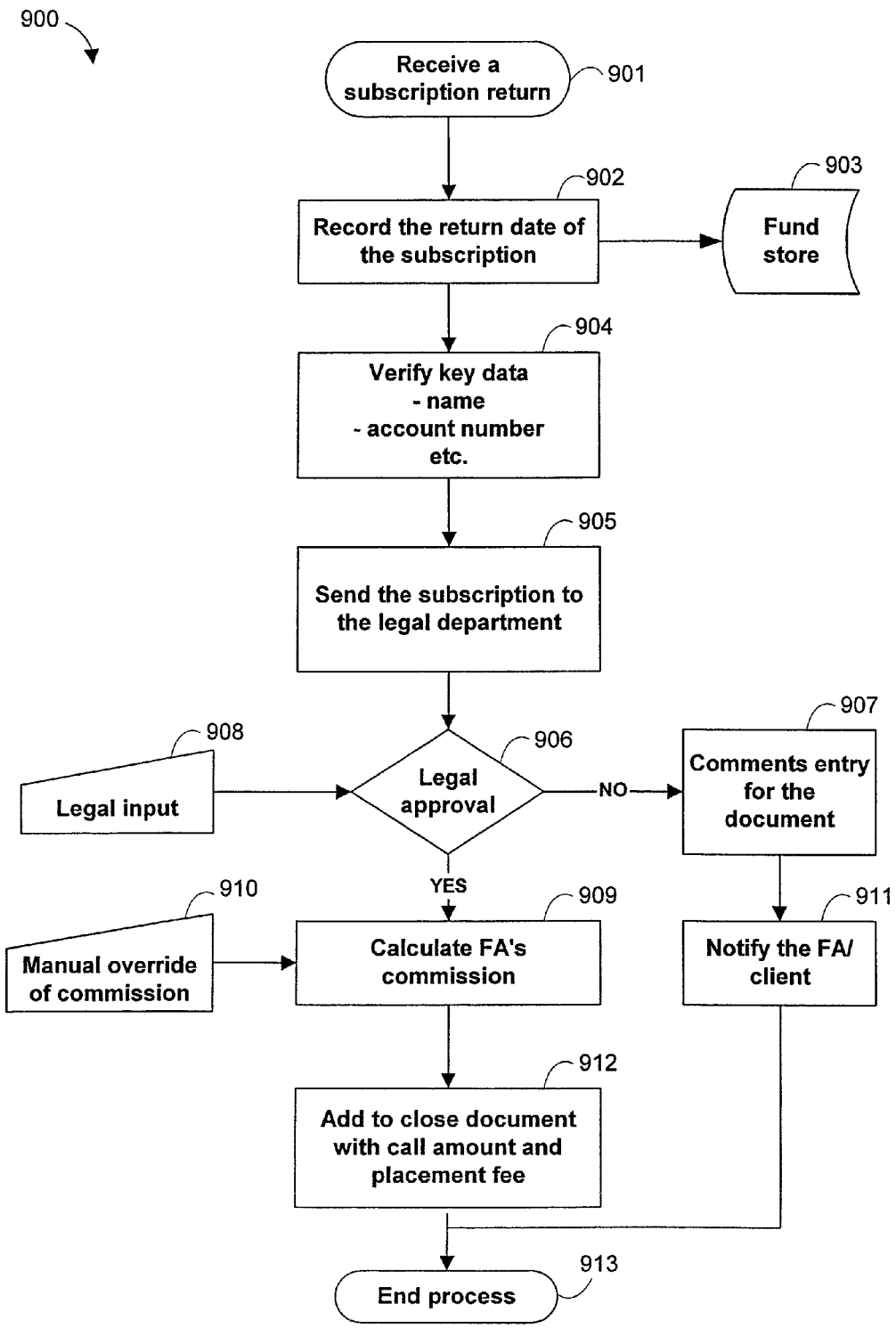
FIG. 9 is a flow chart illustrating a preferred embodiment of the process the schedule returned step 204 of the method illustrated in FIG. 2.

FIG. 9 is a flow chart illustrating a preferred embodiment of the process the schedule returned step 204 of the method illustrated in FIG. 2. Specifically, FIG. 9 illustrates the flow of information that occurs upon receiving a subscription 901. At step 902, the return date of the subscription is recorded in the fund store database 903. At step 904, key data (e.g., name, account number, etc.) is verified. At step 905, the subscription is sent to the legal department where legal input 908 is received. If at 906 legal rejects the subscription, comments are entered for the document 907 and the financial advisor and/or client is notified at step 911, and the process ends at 913. If legal approves the subscription, the financial advisor's commission is calculated at step 909 and may be manually overridden 910. At 912, the commission is added to the close document with the call amount and placement fee. The process ends at step 913.

Figure 10:
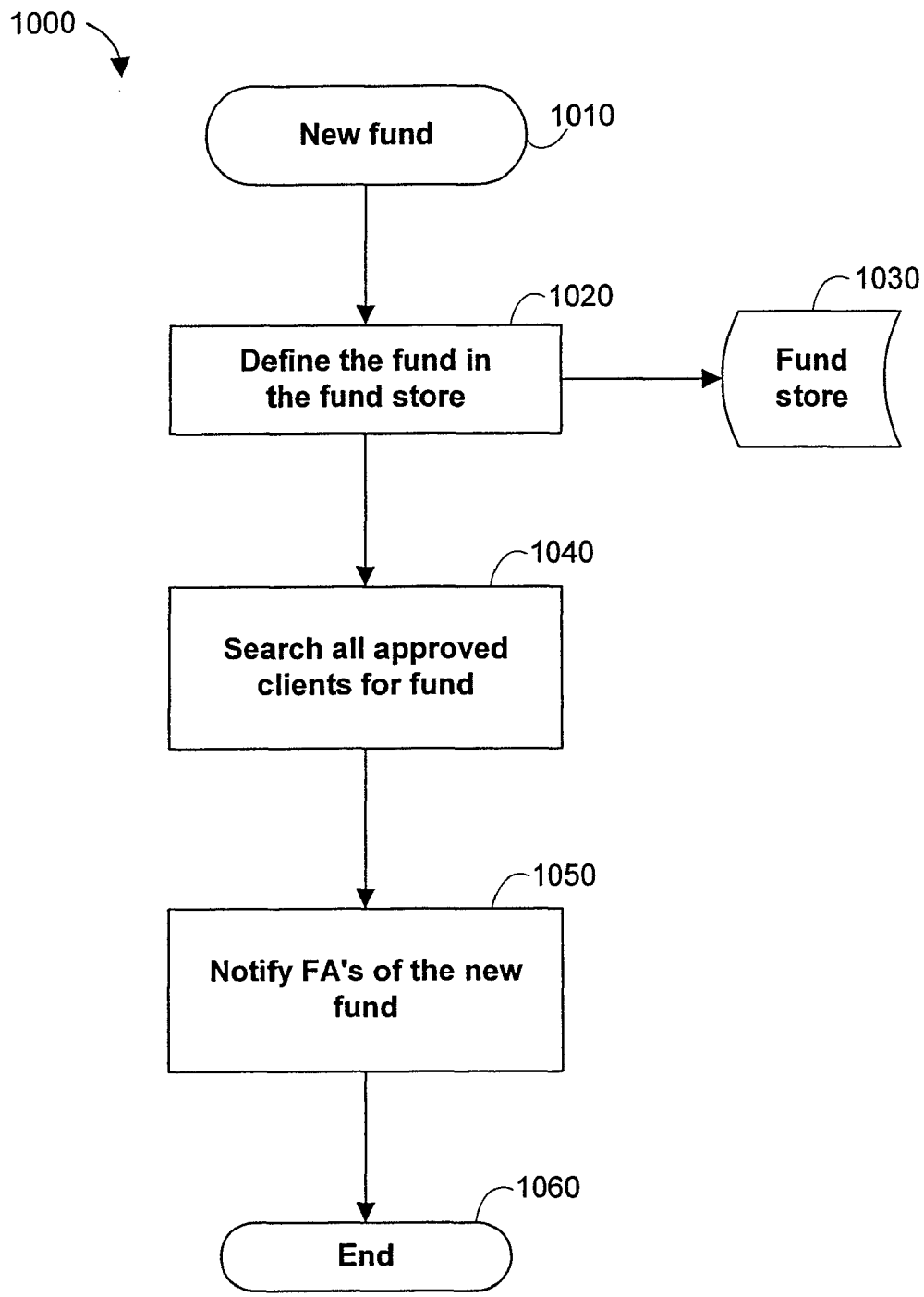
FIG. 10 is a flow chart illustrating a preferred embodiment of a method according to this invention for adding a new feeder fund.

FIG. 10 is a flow chart illustrating a preferred embodiment of a method 1000 according to this invention for adding a new fund. At step 1010, the sponsor chooses to add a new fund. At 1020, the sponsor must define the fund which is stored in the fund store database 1030. At step 1040, all client files are searched for clients who may be interested in investing in such a fund. At step 1050, financial advisors are notified of the new fund and each financial advisor is provided with a list of his or her clients who may be interested in the fund. The method ends at step 1060.

FIG. 11 is a tabular compilation illustrating a preferred embodiment of the method according to this invention. The grid provides summary information from the Confidential Program Memorandum and the Program Fund Memoranda including the investment strategy 1101, and program fund information 1102 (including the name 1103, sponsor fees 1104, and liquidity 1105). The table also provides portfolio fund information 1106 (including program portfolio manager information 1107, minimum direct investment amount 1108, compound annualized ROR 1109, fees 1110, and information about assets under management 1111).

Figure 12:
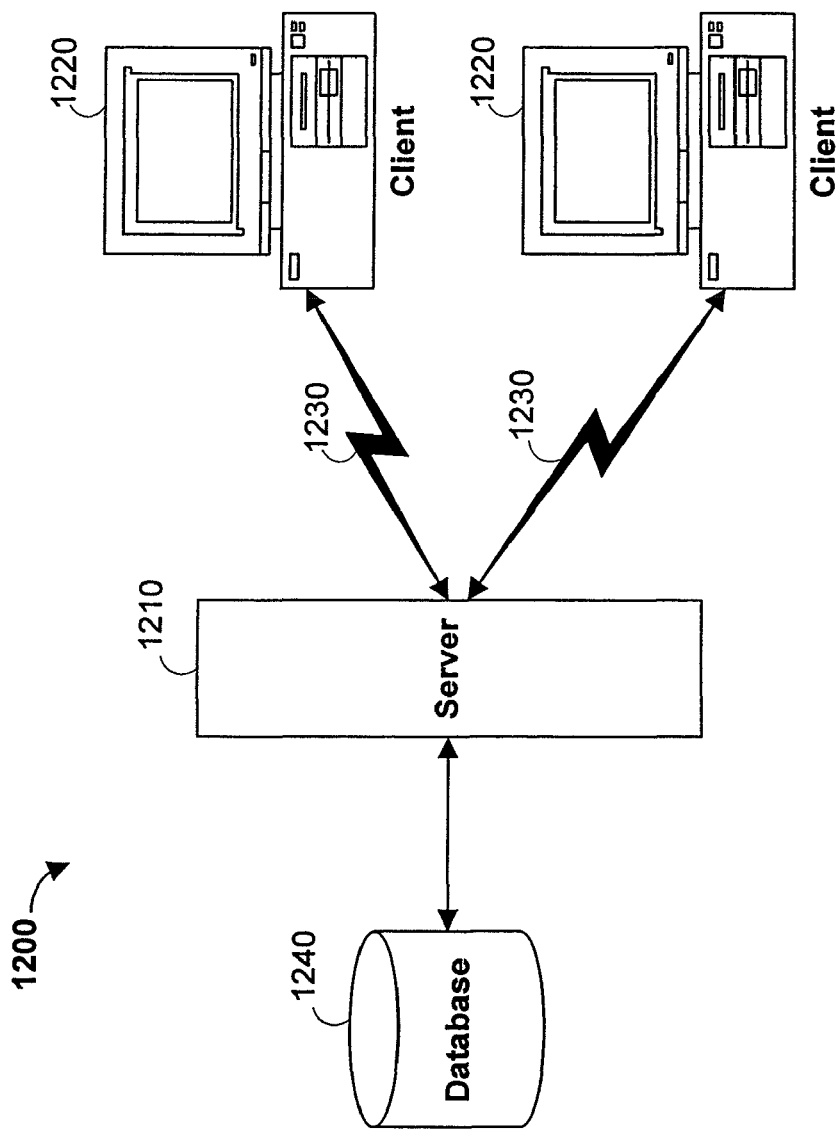
FIG. 12 is illustrative of an exemplary system for implementing the method in accordance with some embodiments of the present invention.

FIG. 12 is illustrative of an exemplary system for implementing the method in accordance with some embodiments of the present invention. The system provides a infrastructure so that the methods discussed above can be carried out by a network such as a client/server configuration, as illustrated in system 1200 of FIG. 12. The server 1210 sends and receives data from clients 1220 including financial advisors, the sponsor, managers, and other departments in the financial management firm. Communication is via network lines or phone lines 1230 providing access via the Internet, Intranet, or any other suitable network. The server 1210 utilizes a database 1240 to retrieve data requested by an application or a client 1220, and store data that is received from the client 1220.

Figure 13:
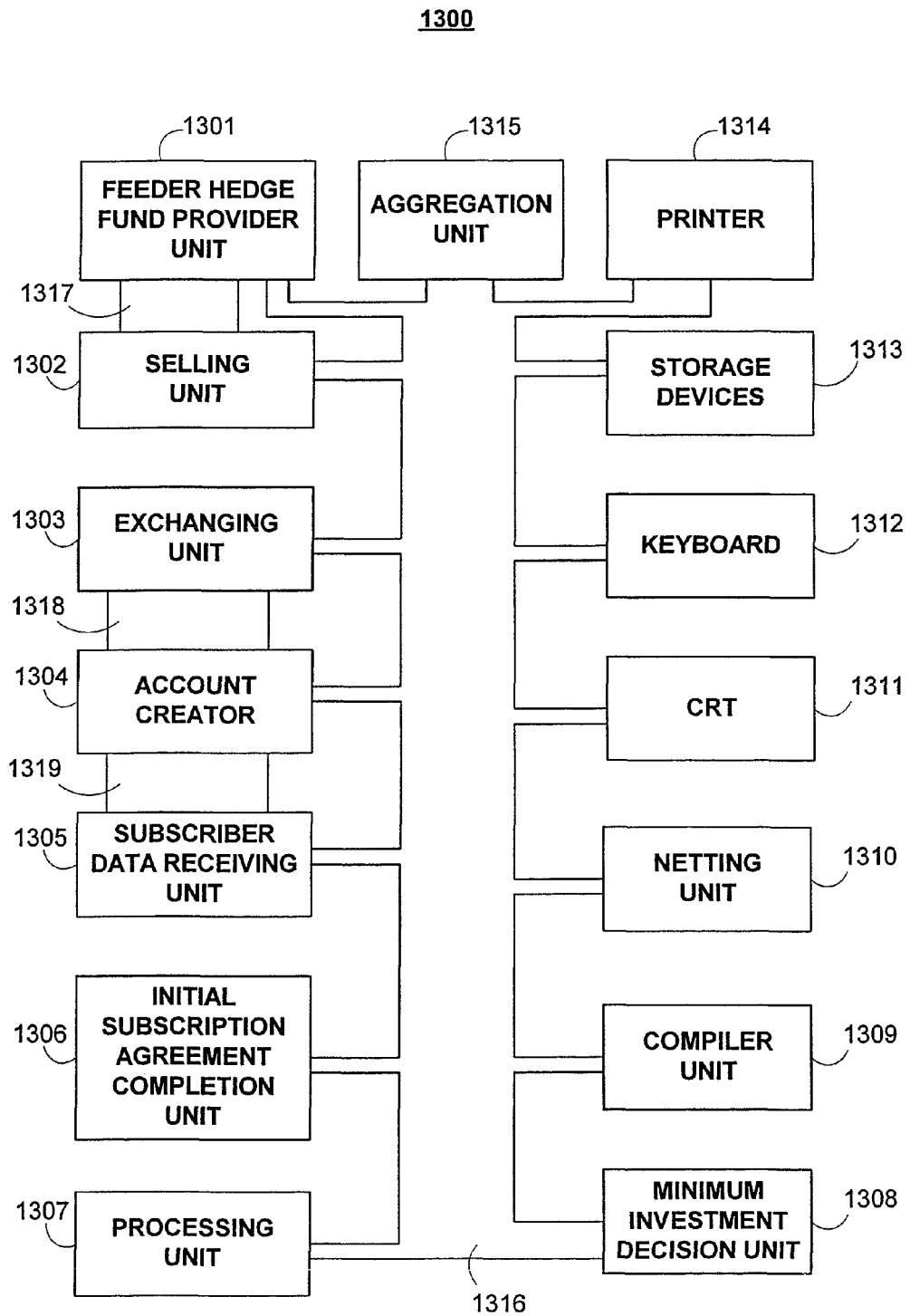
FIG. 13 is an illustration of a preferred exemplary system for implementing the method according to the present invention.

FIG. 13 offers an overview of a preferred embodiment of a system 1300 for implementing the method according to the invention. System 1300 includes a plurality of units 1301-1315 interconnected by system bus 1316. In addition, units 1301 and 1302, 1303 and 1304, and 1304 and 1305, are interconnected by respective local buses 1317, 1318, 1319.

A feeder hedge fund provider unit 1301 provides more than one feeder hedge fund to qualified investors and a selling unit 1302 sells the funds to qualified investors in the program.

The exchanging unit 1303, on request of a qualified purchaser within the program, exchanges one fund within the program for another. In some embodiments, a money-market fund is provided within the program of funds. In such embodiments, the exchanging unit 1303 may exchange one investment in one fund for an investment in the money-market fund and/or may exchange an investment in the money-market fund for an investment in at least one other fund within the program.

The account creator 1304 creates an account for qualified purchasers eligible to participate in the program of funds. In so doing, the account creator 1304 may receive subscriber data using the subscriber data receiving unit 1305. An initial subscription agreement completion unit 1306 executes an initial subscription unit that may be used to execute future purchases and redemptions within the program without requiring the same information for each future transaction. A processing unit 1307 processes subscriber transactions including exchanges and redemptions of funds within the program. The processing unit 1307 utilizes subscriber data received by the receiving unit 1305 and data from the initial subscription agreement completion unit to process transactions.

A minimum investment decision unit 1308 is used to determine whether a qualified purchaser meets minimum investment requirements for investment in a fund. A compiler unit 1309 compiles tables comparing non-common features of funds within the program. Such tables may be compiled in any media (including electronic, digital, paper, etc.). A netting unit 1310 nets subscriptions with redemptions, and an aggregation unit 1315 aggregates related accounts.

A printer 1314 prints, among other things, reports providing performance data. A CRT 1311 is used to display data that may also be printed by the printer 1314. Data may be inputted into the system using a keyboard 1312 or any input device including scanners, touch-screen, modems, network lines, etc. A storage device 1313 maintains investor data and software implementing the methods of this invention.

Figure 14:
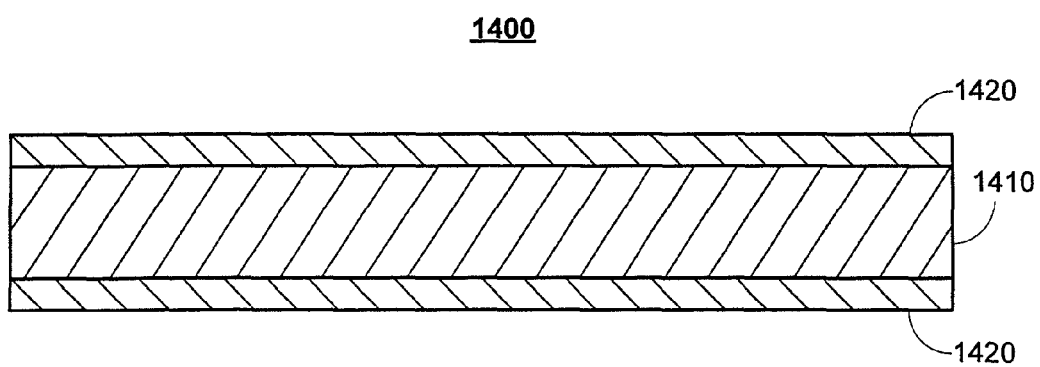
FIG. 14 is a cross-sectional view of a magnetic data storage medium encoded with a set of machine-executable instructions for performing the method according to the present invention.

FIG. 14 presents a cross section of a magnetic data storage medium 1400 which can be encoded with a machine executable program that can be carried out by systems such as system 1100 of FIG. 11 and system 1200 of FIG. 12. Medium 1400 can be floppy diskette or hard disk, having a suitable substrate 1401, which may be conventional, and a suitable coating 1402, which may be conventional, on one or both sides, containing magnetic domains (not visible) whose polarity or orientation can be altered magnetically. Medium 1400 may also have an opening (not shown) for receiving the spindle of a disk drive or other data storage device.

The magnetic domains of coating 1402 of medium 1400 are polarized or oriented so as to encode, in manner which may be conventional, a machine-executable program such as that described above in connection with FIGS. 1-10, for execution by systems such as system 1100 of FIG. 11 and system 1200 of FIG. 12.

Figure 15:
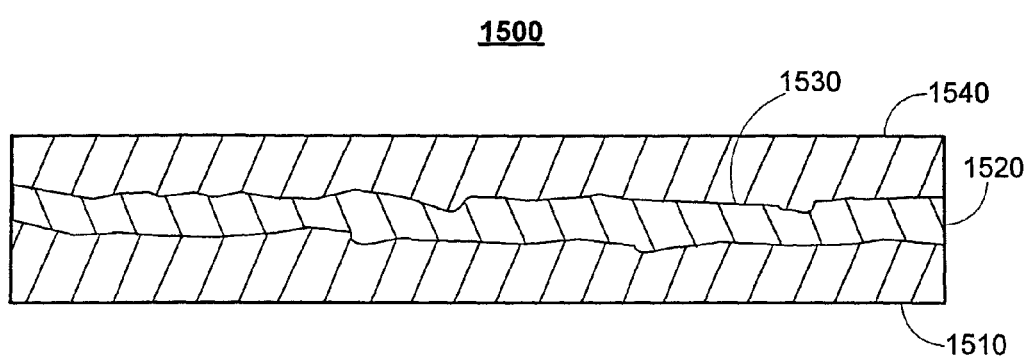
FIG. 15 is a cross-sectional view of an optically readable data storage medium encoded with a set of machine executable instructions for performing the method according to the present invention.

FIG. 15 shows a cross section of an optically-readable data storage medium 1500 which also can be encoded with such a machine-executable program, which can be carried out by systems such as system 1100 of FIG. 11 and system 1200 of FIG. 12. Medium 1500 can be a conventional compact disk read only memory (CD-ROM) or digital video disk read only memory (DVD-ROM) or a rewriteable medium such as a CD-R, CD-RW, DVD-R, DVD-RW or DVD-RAM or a magneto-optical disk which is optically readable and magneto-optically rewriteable. Medium 1500 preferably has a suitable substrate 1501, which may be conventional, and a suitable coating 1502, which may be conventional, usually on one or both sides of substrate 1501.

In the case of a CD-based or DVD-based medium, as is well known, coating 1502 is reflective and is impressed with a plurality of pits 1503, arranged on one or more lasers, to encode the machine-executable program. The arrangement of pits is read by reflecting laser light off the surface of coating 1502. A protective coating 1504, which preferably is substantially transparent, is provided on top of coating 1502.

In the case of magneto-optical disk, as is well known, coating 1502 has no pits 1503, but has a plurality of magnetic domains whose polarity or orientation can be changed magnetically when heated above a certain temperature, as by a laser (not shown). The orientation of the domains can be read by measuring the polarization of laser light reflected from coating 1502. The arrangement of the domains encodes the program as described above.

Thus, it is seen that the present invention provides low minimum investments, exchange rights among funds with fungible business terms, prompt redemption and exchange proceeds availability, and transparency of each feeder fund in such a portfolio contrasted with either no or limited transparency in a fund of funds structure. A family of funds offering a range of strategy alternatives, together with innovative systems and methods for offering and servicing clients investing in the same, provides many investors, whose financial resources have to date restricted their ability to invest in any single hedge fund with access to a dynamically managed portfolio of funds (which invest substantially all their capital in hedge funds). One skilled in the art will appreciate that the present invention can be practiced by other than the described embodiments, which are presented for purposes of illustration and not of limitation.

What is claimed is:

1. A method for offering a program of hedge funds, said method comprising:
   providing a plurality of feeder hedge funds by a feeder hedge fund providing unit comprising hardware, each of said feeder hedge funds having a value; and
   selling one of said feeder hedge funds to a qualified purchaser using a selling unit comprising hardware.

2. The method of claim 1, wherein said providing said plurality of feeder hedge funds comprises providing a plurality of single-manager feeder hedge funds.

3. The method of claim 1, wherein said providing a plurality of feeder hedge funds comprises providing at least one money market fund.

4. The method of claim 1, further comprising:
   opening a subscriber account, said opening including:
   receiving subscriber data, and
   completing an initial subscription agreement; and
   processing subscriber transactions including investments in multiple ones of said plurality of hedge funds, said processing including using said subscriber data from said initial subscription agreement for each of said investments.

5. The method of claim 1, wherein said processing comprises executing a transaction form.

6. The method of claim 5, wherein said executing a transaction form comprises executing an abbreviated purchase form.

7. The method of claim 5, wherein said executing a transaction form comprises executing an abbreviated exchange form.

8. The method of claim 5, wherein said executing a transaction form comprises executing an abbreviated purchase/exchange form.

9. The method of claim 1, further comprising preparing a consolidated report, said report providing performance data on more than one of said feeder funds.

10. The method of claim 9, wherein said preparing a consolidated report comprises preparing a periodic statement.

11. The method of claim 1, wherein each of said feeder hedge funds has redemption features substantially similar to each other of said feeder hedge funds.

12. The method of claim 1, wherein said providing comprises establishing for each said feeder hedge fund a minimum investment amount lower than a minimum investment amount for a hedge fund that (a) is outside said program and (b) has characteristics other than said minimum investment amount that are substantially identical to said characteristics.

13. The method of claim 1, further comprising processing an initial program subscription for each account, said initial program subscription comprising collecting data for use in investing in any of said plurality of feeder hedge funds.

14. The method of claim 1, further comprising:
establishing an account for at least one said qualified purchaser; and
aggregating said account with at least one other related account to compute an aggregated total.

15. The method of claim 1, further comprising determining whether said aggregated total at least equals a predetermined minimum investment threshold.

16. The method of claim 1, wherein said providing comprises providing more than one share class in at least one said feeder hedge fund.

17. The method of claim 16, wherein said providing more than one share class in at least one said feeder hedge fund comprises providing more than one series in at least one of said more than one share class.

18. The method of claim 17, wherein said providing more than one series in at least one of said more than one share class comprises providing more than one series in each of said more than one share class.

19. The method of claim 16, wherein said providing more than one share class in at least one said feeder hedge fund comprises providing more than one share class in each of said feeder hedge funds.

20. The method of claim 19, wherein said providing more than one share class in each of said feeder hedge funds comprises providing more than one series in at least one of said more than one share class.

21. The method of claim 20, wherein said providing more than one series in at least one of said more than one share class comprises providing more than one series in each of said more than one share class.

22. The method of claim 1, wherein said providing comprises providing more than one series in at least one said feeder hedge fund.

23. The method of claim 22, wherein said providing more than one series in at least one said feeder hedge fund comprises providing more than one series in each of said feeder hedge funds.

24. The method of claim 1, wherein said providing a plurality of feeder hedge funds comprises providing a plurality of feeder hedge funds using multiple different investment strategies.

25. The method of claim 1, wherein said providing a plurality of feeder hedge funds comprises providing a plurality of feeder hedge funds with like rules.

26. The method of claim 25, wherein said providing a plurality of feeder hedge funds with like rules comprises providing a plurality of feeder hedge funds with at least one of:
(a) like redemption rules;
(b) like subscription rules;
(c) like shared classes;
(d) like reporting rules;
(e) like customer account reporting; and
(f) like customer account record-keeping.

27. The method of claim 25, further comprising preparing a tabular compilation for said plurality of hedge funds.

28. The method of claim 27, wherein said preparing comprises comparing features of more than one of said plurality of hedge funds.

29. The method of claim 1, wherein said selling a feeder hedge fund to a qualified purchaser comprises utilizing an on-line offering qualification system.

30. The method of claim 29, wherein said utilizing an on-line offering qualification system comprises providing a financial advisor with said system.

31. The method of claim 29, wherein said utilizing an on-line offering qualification system comprises determining whether a potential investor meets predetermined qualification criteria.

32. The method of claim 1, further comprising netting subscriptions with redemptions.

33. A system for offering a program of hedge funds, said system comprising:
means for providing a plurality of feeder hedge funds, each of said feeder hedge funds having a value; and
means for selling one of said feeder hedge funds to a qualified purchaser.

34. The system of claim 33, further comprising:
means for opening a subscriber account, said opening including:
means for receiving subscriber data, and
means for completing an initial subscription agreement; and
means for processing subscriber transactions including investments in multiple ones of said plurality of hedge funds, said processing including using said subscriber data from said initial subscription agreement for each of said investments.

35. The system of claim 33, further comprising means for preparing a consolidated report, said report providing performance data on more than one of said feeder funds.

36. The system of claim 33, further comprising means for processing an initial program subscription for each account, said initial program subscription comprising collecting data for use in investing in any of said plurality of feeder hedge funds.

37. The system of claim 33, further comprising:
means for establishing an account for at least one said qualified purchaser; and
means for aggregating said account with at least one other related account to compute an aggregated total.

38. The system of claim 37, further comprising means for determining whether said aggregated total at least equals a predetermined minimum investment threshold.

39. The system of claim 37 further comprising means for preparing a tabular compilation for said plurality of hedge funds.

40. The system of claim 33 further comprising means for netting subscriptions with redemptions.

41. A system for offering a program of hedge funds, said system comprising:
a feeder hedge fund providing unit that provides a plurality of feeder hedge funds, each of said feeder hedge funds having a value; and
a selling unit that sells one of said feeder hedge funds to a qualified purchaser.

42. The system of claim 41, further comprising:
an account creator that opens a subscriber account;
a subscriber data receiving unit that feeds into said subscriber account opening unit;

an initial subscription agreement completion unit that completes the initial subscription agreement using data from said subscriber data receiving unit; and a processing unit that processes subscriber transactions including investments in multiple ones of said plurality of hedge funds including by using said subscriber data from said initial subscription agreement for each of said investments.

43. The system of claim 41, further comprising a consolidated report preparer that prepares reports providing performance data on more than one of said feeder funds.

44. The system of claim 41, further comprising an initial program subscription processing unit that processes initial program subscriptions for each account, said initial program subscriptions comprising data for use in investing in any of said plurality of feeder hedge funds.

45. The system of claim 41, further comprising:
an account creator that establishes an account for at least one said qualified purchaser; and
an aggregation unit that aggregates said account with at least one other related account to compute an aggregated total.

46. The system of claim 45, further comprising a minimum balance decision unit that determines whether said aggregated total at least equals a predetermined minimum investment threshold.

47. The system of claim 45, further comprising a compiler unit that prepares a tabular compilation for said plurality of hedge funds.

48. The system of claim 45, further comprising netting unit that nets subscriptions with redemptions.

49. A non-transitory machine-readable data storage medium encoded with a set of machine-executable instructions for using a data processing system to perform a method for offering a program of hedge funds, said method comprising:
providing a plurality of feeder hedge funds, each of said feeder hedge funds having a value; and
selling one of said feeder hedge funds to a qualified purchaser.

50. The machine-readable data storage medium of claim 49, wherein said method further comprises:
opening a subscriber account, said opening including:
receiving subscriber data, and
completing an initial subscription agreement; and
processing subscriber transactions including investments in multiple ones of said plurality of hedge funds, said processing including using said subscriber data from said initial subscription agreement for each of said investments.

51. The machine-readable data storage medium of claim 49, wherein said method further comprises preparing a consolidated report, said report providing performance data on more than one of said feeder funds.

52. The machine-readable data storage medium of claim 49, wherein said method further comprises processing an initial program subscription for each account, said initial program subscription comprising collecting data for use in investing in any of said plurality of feeder hedge funds.

53. The machine-readable data storage medium of claim 49, wherein said method further comprises:
establishing an account for at least one said qualified purchaser; and
aggregating said account with at least one other related account to compute an aggregated total.

54. The machine-readable data storage medium of claim 49, wherein said method further comprises determining whether said aggregated total at least equals a predetermined minimum investment threshold.

55. The machine-readable data storage medium of claim 49, wherein said method further comprises preparing a tabular compilation for said plurality of hedge funds.

56. The machine-readable data storage medium of claim 49, wherein said method further comprises netting subscriptions with redemptions.

57. The machine-readable data storage medium of any one of claims 49, 50, 51, 52, 53, 54, 55 and 56, where said data storage medium is magnetic.

58. The magnetic machine-readable data storage medium of claim 57, where said data storage medium is a floppy diskette.

59. The magnetic machine-readable data storage medium of claim 57, where said data storage medium is a hard disk.

60. The machine-readable data storage medium of any one of claims 49, 50, 51, 52, 53, 54, 55 and 56, where said data storage medium is optically readable.

61. The optically readable storage medium of claim 60, where said data storage medium is one of (a) a CD-ROM, (b) a CD-R, (c) a CD-RW, (d) a DVD-ROM, (e) a DVD R, (f) DVD-RW, and (g) a DVD-RAM.

62. The optically readable data storage medium of claim 60, where said data storage medium is a magneto-optical disk.

* * * * *